Dec. 5, 1967  F. JAKOB ETAL  3,356,856
ASSEMBLIES INCLUDING AN ALTERNATING CURRENT DEVICE
ATTACHMENT TO BE BATTERY-DRIVEN
Filed Aug. 27, 1964  2 Sheets-Sheet 1
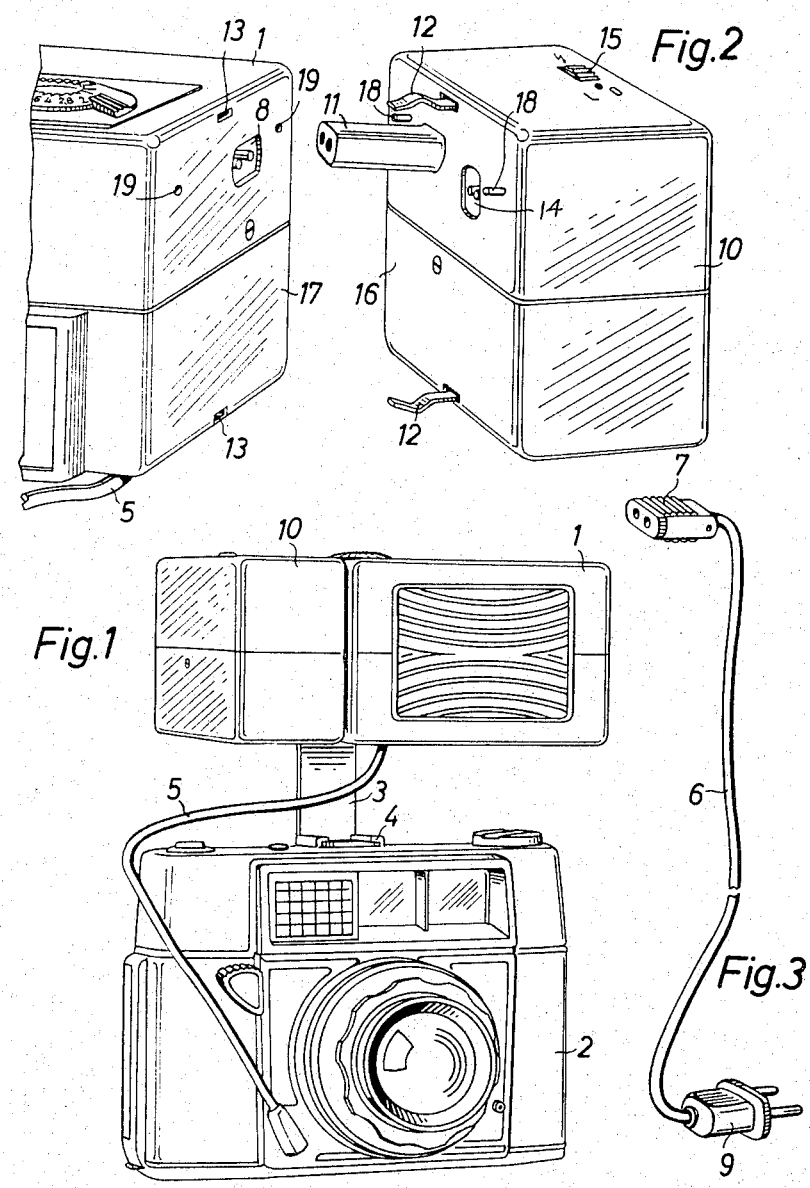
INVENTOR.
FRANZ JAKOB
HANS-PETER SIMSON
BY United States Patent Office 3,356,856
Patented Dec. 5, 1967

3,356,856
ASSEMBLIES INCLUDING AN ALTERNATING CURRENT DEVICE ATTACHMENT TO BE BATTERY-DRIVEN
Franz Jakob, Unterhaching, near Munich, and Johann Peter Simson, also known as Hans-Peter Simson, Tutzing, Germany, assignors to Agfa Aktiengesellschaft, Leverkusen, Germany
Filed Aug. 27, 1964, Ser. No. 392,468
Claims priority, application Germany, Aug. 31, 1963, A 43,954
9 Claims. (Cl. 307—64)

The present invention relates to electrical assemblies.

More particularly the present invention relates to electrical assemblies which include a device, such as an electronic flash device for cameras, which requires alternating current for its operation.

Devices of this latter type are conventionally provided with a means such as an electrical cable by which the device can be connected with a source of alternating current required for the operation of the device. If, however, the device, such as an electronic flash device, is to be battery operated, then an attachment is required, the attachment having a battery and a chopper circuit or the like, so that the attachment then can be connected through a suitable cable with the device for operating the latter. One of the disadvantages of these arrangements is that the attachment must rest on some suitable support, or be fixed to a suitable support, or it must simply be carried by the operator. Also, it is possible to provide a device of the above type with a converter for converting the direct current into alternating current, and a suitable transformer may also be provided, and then the device can be connected to the battery through an electrical connecting structure different from that which electrically connects the device to the source of alternating current. With such structures the operator must be careful to see to it that the battery is not connected to the connection of the device which is provided for the source of alternating current and also that the connection of the device which is provided for the battery is not connected to the source of alternating current, so that unless sufficient care is exercised it will happen that improper connections will be used with the result that the device will be damaged or at least will not be operable.

It is a primary object of the present invention to avoid the above drawbacks while permitting a device, such as an electronic flash device, to be operated either directly from a source of alternating current or from energy derived from a battery.

In particular it is an object of the invention to provide a device of the above type with a single connecting means through which the device is connected either directly with a source of alternating current or with a source whose energy is derived from a battery, so that since there is but one connection provided for the device it is not possible to make erroneous connections of the type referred to above.

In addition it is an object of the present invention to avoid the above-mentioned inconvenience of either providing a suitable support for a battery attachment or requiring the operator himself to carry the battery attachment.

Furthermore, it is an object of the present invention to provide a structure which will securely and reliably connect a battery attachment to a device which requires alternating current for its operation.

The objects of the present invention also include the provision of a structure which will eliminate the possibility of any projections which might accidently catch on undesired objects or which might accidently cause injury to the operator.

Also it is an object of the invention to provide a structure which when it uses a battery attachment of the type referred to above nevertheless is still quite compact.

The objects of the present invention also include structure which will enable a battery attachment of the above type to be charged when it is not used to drive the device which requires alternating current for its operation.

With the above objects in view the invention includes, in an electrical assembly, a device, such as an electronic flash device, which requires alternating current for its operation, this device being provided in accordance with the invention with a first electrical connecting means adapted to be attached to one end of an electrical cable the other end of which can be placed in communication with a source of alternating current such as a suitable wall outlet. The assembly of the invention also includes an attachment composed of a battery which provides direct current of low voltage and a means for converting the direct current of low voltage to alternating current of higher voltage. The attachment of the invention is provided with a second connecting means which forms an output for the alternating current of higher voltage and which is capable of being removably connected with the first connecting means for directly connecting the attachment of the invention to the device of the invention, when the electrical cable is not connected thereto, so that the device can then be driven from the battery attachment. It will thus be seen that with the assembly of the invention the single electrical connecting means of the device which requires alternating current for its operation can only be connected either to the battery attachment of the invention or to an electrical cable, so that errors of the type referred to above cannot occur.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective illustration of the assembly of the invention, the illustrated example showing the assembly in its condition for operation from a battery, and also FIG. 1 shows the structure of the invention as applied to a camera, although it is to be understood that this illustration is only by way of example and that the invention is of general utility;

FIG. 2 is a perspective, partly fragmentary illustration, on an enlarged scale as compared to FIG. 1, showing the device and attachment of the invention separated from each other; and FIG. 3 is a perspective illustration of an electrical cable capable of connecting the device of the invention to a source of alternating current when the attachment is not used.

Figure 4:
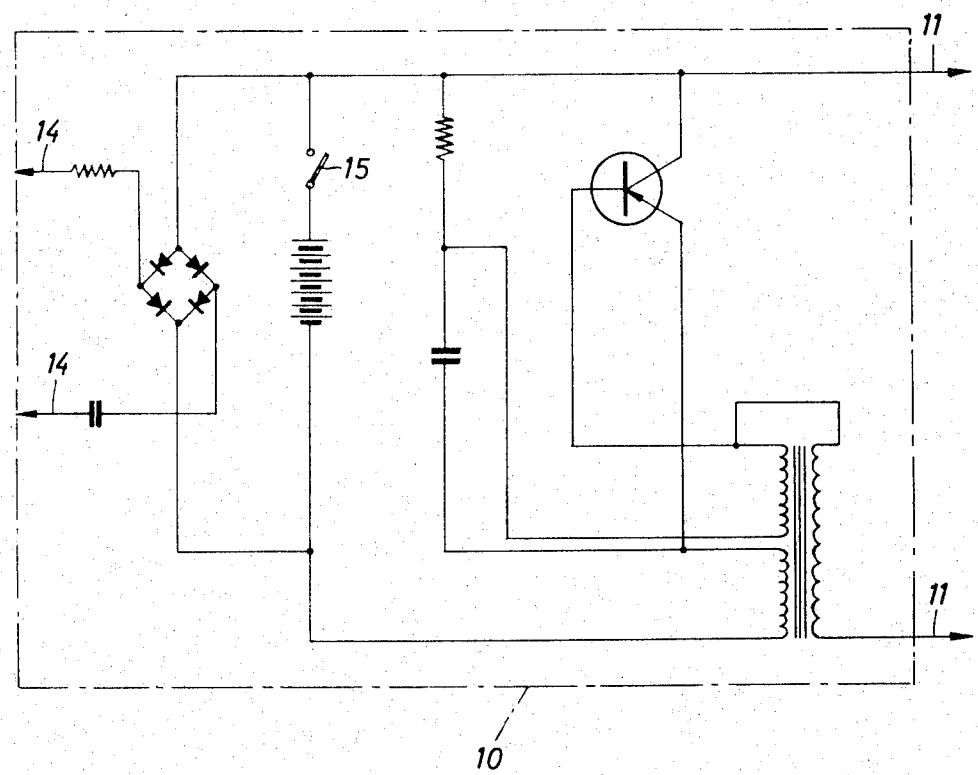
FIG. 4 is a schematic illustration of the electric parts of the attachment.

Referring now to the drawings, the assembly of the invention is illustrated, by way of example, as including an electronic flash device 1 which requires alternating current for its operation. The flash device 1 is shown in FIG. 1 as attached removably to a camera 2 by means of a suitable foot member 3 which at one end is received in a well known manner in a shoe 4 fixedly carried by the top of the camera. The electronic flash device 1 is designed for operation with normal alternating current available from the lines supplied with alternating current by a public utility, so that by attaching the electronic device 1 to a suitable wall outlet, it can be operated. FIG. 1 illustrates a cable 5 permanently connected with the device 1 and connected at its end distant from the device 1 to the camera for synchronizing the operation of the flash device with the operation of the camera, as is well known. FIG. 3 shows a conventional electrical cable 6 which at its end 7 is provided with a conventional plug structure for receiving prongs of the electrical connecting means 8 of the device 1, so that when the electrical connecting means 8 of the device 1 is connected with the plug 7 of the cable 6, the prong connection 9 of the cable 6 can be placed in a suitable wall outlet so that in this way the device 1 can be supplied with normal alternating current required for its operation. It is emphasized that the electrical connecting means 8 of the device 1 forms, in accordance with the invention, the only electrical connecting means of the device 1 so that it is only through the connecting means 8 that the device 1 can be operated.

Also in accordance with the present invention, the assembly includes an attachment 10 provided with a battery which forms a source of direct current of low voltage, the attachment also including a means for converting this direct current into alternating current of higher voltage. The attachment 10 includes a connecting means 11 which forms the output for the alternating current of higher voltage, and this connecting means 11 is rigidly fixed with and projects from the wall 16 of the attachment 10 and is of such a size and configuration that it can receive the prongs of the connecting means 8 so that through the connecting means 11 the attachment 10 can be directly connected with the connecting means 8 of the device 1 for operating the latter. Thus, the above-described electronic flash device 1 can be driven either from the attachment 10 or from alternating current supplied through the cable 6, and in both cases the same connecting means 8 is used.

While many known structures are available for fastening the attachment 10 removably to the device 1, the particularly simple fastening structure according to the invention includes a clamping means carried in part by the device 1 and in part by the attachment 10 for removably clamping the latter to the device 1. In the illustrated example the clamping means includes a pair of springy clamping members 12 fixed to and projecting from the wall 16 from which the connecting means 11 also projects, and it is to be noted that the clamping springs 12 are situated at the wall 16 within the confines of the outer periphery thereof. The wall 17 of the device 1 is formed with cutouts 13, situated within the confines of the periphery of the exterior wall 17, and the springy clamping members 12 respectively extend through the cutouts 13 into the interior of the device 1 where they cooperate with unillustrated detent structures into which the springy clamping members 12 snap when the exterior wall 16 of the attachment 10 is situated directly next to the exterior wall 17 of the device 1. As is apparent from FIG. 2 the members 12 have portions of substantially V-shaped configuration, and it is these portions which snap into mating V-shaped recesses of the detent members carried in the interior of the device 1. In addition, suitable dowel pins 18 are fixed to and project from the wall 16 and are received in mating openings 19, respectively, of the wall 17, so that a precise orientation of the attachment 10 with respect to the device 1 is assured.

In accordance with a further feature of the invention, a third connecting means 14 is provided for the attachment 10, this electrical connecting means 14 having the same construction as the electrical connecting means 8. When the structure is not used the cable 6 can have its end portion 7 electrically connected with the connecting means 14 while the prong connection 9 of the cable 6 can be placed in a suitable wall outlet so that in this way the cable 6 can also be used to place the attachment 10 in connection with a source of alternating current for charging the attachment 10 when it is not used. For this purpose the attachment 10 is also provided with a switch means 15 capable of placing the attachment 10 either in a charging condition, when the attachment 10 is not used and is connected with the cable 6 to be placed thereby in communication with a source of alternating current, as described above, or in a discharging condition when the attachment 10 is removably connected with the device 1, for operating the latter. Also, the switch means can be so constructed in the interior of the attachment 10 that when the cable 6 is connected with the connecting means 14 the switch means 15 is automatically placed in a position which places the attachment 10 in its charging condition, so that during charging the generator can not be driven. Of course, with such construction when the end 7 of cable 6 is removed from the connection means 14, the switch 15 automatically assumes a position placing the attachment 10 in its discharging condition so that it will properly operate the device 1 when attached thereto.

The construction of the releasable clamping means, described above, so that it does not project either from the attachment 10 or the device 1 when the attachment 10 is connected thereto eliminates any projections which might accidentally catch undesirably on objects or cause injury to the operator. This latter result if further enhanced by a further feature of the invention according to which the size and configuration of the exterior wall 16 is the same as the size and configuration of the exterior wall 17 so that when they are located directly next to each other and oriented (by pins 18 and openings 19) so that they are precisely in alignment with each other, the attachment 10 forms an extension of the device 1 providing the compact assembly 1, 10 illustrated particularly in FIG. 1. Of course, the portion of the connecting means 11 which projects from the wall 16 is received in its entirety in the device 1 when the attachment 10 is connected thereto so that the wall 16 will be situated directly next to and in engagement with the wall 17.

Of course, many of the above-mentioned details are not essential to the invention. Thus, the springy clamping members 12 can be connected to the device 1 to cooperate with structure carried by the attachment 10 which in this case would be provided with the openings 13 at its wall 16. Also, the several connecting means 8, 14, and 11, as well as the end 7 of the cable 6 can have structures different from those illustrated. Finally, the invention is not limited to electronic flash devices, but can be used with other electrical assemblies such as electric razors, electric coffee mills, and the like. Also, the invention can be used with devices which require direct current for their operation, so that in this case the attachment would not require a converter.

It will be understood that each of the elements described above, or two or more together, may also find a useful application in other types of electrical assemblies differing from the types described above.

While the invention has been illustrated and described as embodied in electrical assemblies including devices capable of being battery driven, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electrical assembly, in combination, an electronic flash device, said device requiring high voltage alternating current for its operation, and said device carrying a first electrical connecting means; an electrically conductive cable having one end adapted to be attached to a source of alternating current of predetermined high voltage such as a wall outlet, said cable having an opposite end adapted to be removably connected by said first connecting means to said device for placing the latter in communication with said source of alternating current; and an attachment including a battery and means for changing the direct current of low voltage of said battery to alternating current of said predetermined high voltage, said attachment including a second connecting means forming an output for said alterating current of predetermined high voltage and adapted to removably connect said attachment to said first connecting means when said cable is not connected thereto for operating said device with said attachment, said second connecting means connecting said attachment directly to said first connecting means and thus to said electrical device, and said attachment having a third connecting means identical with said first connecting means for removably connecting said opposite end of said cable to said attachment for charging the latter when said one end of said cable is connected to a source of alternating current.

2. In an assembly as recited in claim 1, said attachment including a switch means for optionally placing said attachment in a discharge condition or in a charging condition, said switch means being in said discharge condition when said second connecting means is connected with said first connecting means and in said charging condition when said cable is connected with said third connecting means.

3. In an assembly as recited in claim 1, said opposite end of said cable, when removably connected with said third connecting means, automatically placing said attachment in a charging condition and said attachment being automatically in a discharging condition when said opposite end of said cable is not connected to said third connecting means.

4. In an electrical assembly, in combination, an electronic flash device, said device requiring high-voltage alternating current for its operation, and said device carrying a first electrical connecting means; an electrically conductive cable having one end adapted to be attached to a source of alternating current of predetermined high voltage such as a wall outlet, said cable having at the opposite end thereof cable connecting means adapted to be removably connected to said first connecting means of said device for placing the latter in communication with said source of alternating current; and an attachment including a battery and means for changing the direct current of low voltage of said battery to alternating current of said predetermined high voltage, said attachment including a second electrical connecting means identical with said cable connecting means and forming an output for said alternating current of predetermined high voltage, said second electrical connecting means also adapted to be removably connected to said first connecting means when said cable connecting means is not connected thereto for operating said device by said attachment when said device is not operated by said source of alternating current.

5. A structure as defined in claim 4, wherein said second electrical connecting means is rigidly connected to and projects from said attachment and can receive said first electrical connecting means when the latter is disconnected from said cable.

6. A structure as defined in claim 4, further comprising clamping means carried in part by said device and in part by said attachment for releasably clamping said attachment to said device when said second connecting means is connected to said first connecting means.

7. A structure as defined in claim 6, wherein said clamping means comprises springy clamp members.

8. A structure as defined in claim 6, wherein one part of said clamping means includes clamping members fixed to and projecting from said attachment and another part of said clamping means is received in the interior of said device, the latter having a wall formed with openings through which said clamping members can extend for cooperation with said other part.

9. A structure as defined in claim 4, wherein said device and said attachment are located side by side and said attachment forms an extension of said device in response to connection of said second connecting means with said first connecting means.

References Cited

UNITED STATES PATENTS

| | | | |
|---|---|---|---|
| 2,555,630 | 6/1951 | Bishner | 307—150 XR |
| 2,813,265 | 11/1957 | Finks | 320—2 XR |
| 2,920,260 | 1/1960 | Goffstein | 320—2 XR |
| 3,043,996 | 7/1962 | Hartwig | 307—65 XR |
| 3,044,023 | 7/1962 | Floyd | 331—49 |
| 3,109,132 | 10/1963 | Witte | 320—2 XR |
| 3,192,378 | 6/1965 | Oldenburger | 320—2 XR |
| 3,194,689 | 7/1965 | Deschamps | 320—2 XR |

FOREIGN PATENTS

| | | |
|---|---|---|
| 368,859 | 6/1963 | Switzerland. |
| 224,732 | 2/1958 | Australia. |

ORIS L. RADER, *Primary Examiner.*

T. J. MADDEN, *Assistant Examiner.*